United States Patent
Barbiera

(10) Patent No.: US 12,277,871 B2
(45) Date of Patent: Apr. 15, 2025

(54) METHOD AND APPARATUS FOR CONVERTING RECIPE INSTRUCTIONS BASED ON A USER'S SKILL LEVEL

(71) Applicant: Michael Barbiera, Staten Island, NY (US)

(72) Inventor: Michael Barbiera, Staten Island, NY (US)

( * ) Notice: Subject to any disclaimer, the term of this patent is extended or adjusted under 35 U.S.C. 154(b) by 20 days.

(21) Appl. No.: 18/212,564

(22) Filed: Jun. 21, 2023

(65) Prior Publication Data
US 2024/0428702 A1 Dec. 26, 2024

(51) Int. Cl.
G09B 7/08 (2006.01)
G09B 19/00 (2006.01)

(52) U.S. Cl.
CPC .............. *G09B 7/08* (2013.01); *G09B 19/003* (2013.01)

(58) Field of Classification Search
CPC ................................ G09B 7/08; G09B 19/003
See application file for complete search history.

(56) References Cited

U.S. PATENT DOCUMENTS

| 9,318,030 B2 | 4/2016 | Harris et al. | |
| 2013/0185646 A1* | 7/2013 | Wiggins | H04L 67/62 715/739 |
| 2020/0031155 A1* | 1/2020 | Witbart | B42D 15/00 |
| 2022/0282910 A1* | 9/2022 | Jeong | F25D 23/028 |

OTHER PUBLICATIONS

"The Picture Exchange Communication System (PECS®)", National Autism Resources. Downloaded from website https://nationalautismresources.com/the-picture-exchange-communication-system-pecs/, 5 pages on Apr. 16, 2024; Archived on Jun. 6, 2016 at Internet Archive https://web.archive.org/web/20160606093920/https://nationalautismresources.com/the-picture-exchange-communication-system-pecs/.

* cited by examiner

*Primary Examiner* — Kesha Frisby
(74) *Attorney, Agent, or Firm* — Moser Taboada

(57) ABSTRACT

In some embodiments, a computer implemented method for presenting a recipe includes determining a skill level achieved by a user, providing the user access to a recipe corresponding to the skill level achieved by the user; receiving a selection of an accessible recipe; and displaying a selected recipe.

17 Claims, 15 Drawing Sheets

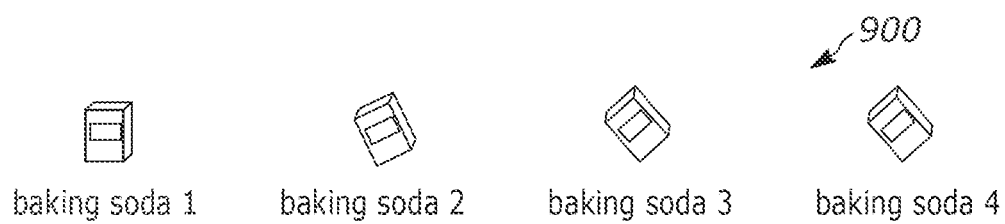
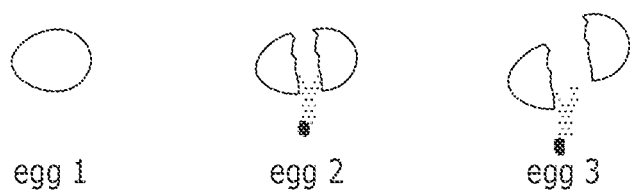
FIG. 9

All QUIZES ⟵ 1000

▷ Beginner Quiz 1 - Dry Measuring Cups
▷ Beginner Quiz 1 - Kitchen Scale - Part 1
▷ Beginner Quiz 1 - Kitchen Scale - Part 2
▷ Beginner Quiz 2 - Identify the Kitchen Tools/Equipment - Part 1
▷ Beginner Quiz 2 - Identify the Kitchen Tools/Equipment - Part 2
▷ Beginner Quiz 3 - Identify the Ingredients - Part 1
▷ Beginner Quiz 3 - Identify the Ingredients - Part 2
▷ Beginner Quiz 3 - Identify the Ingredients - Part 3
▷ Beginner Quiz 3 - Identify the Ingredients - Part 4
▷ Beginner Quiz 3 - Identify the Ingredients - Part 5
▷ Beginner Quiz 3 - Identify the Ingredients - Part 6
▷ Beginner Quiz 3 - Identify the Ingredients - Part 7
▷ Beginner Quiz 3 - Identify the Ingredients - Part 8
▷ Beginner Quiz 4 - Oven Temps - Timers Part 1
▷ Beginner Quiz 4 - Oven Temps - Timers Part 2
▷ Beginner Quiz 4 - Oven Temps - Timers Part 3

FIG. 10A

▷ Level 1 Quiz 2 - Identify the Kitchen Tools
▷ Level 1 Quiz 3 - Identify the Ingredients - Part 1
▷ Level 1 Quiz 3 - Identify the Ingredients - Part 2
▷ Level 1 Quiz 3 - Identify the Ingredients - Part 3
▷ Level 1 Quiz 3 - Identify the Ingredients - Part 4
▷ Level 1 Quiz 3 - Identify the Ingredients - Part 5
▷ Level 1 Quiz 4 - Identify the Cooking Skill
▷ Level 2 Quiz 1 - Identify the Kitchen Tools Equipment
▷ Level 2 Quiz 2 - Identify the Ingredients - Part 1
▷ Level 2 Quiz 2 - Identify the Ingredients - Part 2
▷ Level 2 Quiz 2 - Identify the Ingredients - Part 3
▷ Level 2 Quiz 3 - Identify the Cooking Skill
▷ Level 3 Quiz 1 - Identify the Kitchen Tools Equipment
▷ Level 3 Quiz 2 - Identify the Ingredients - Part 1
▷ Level 3 Quiz 2 - Identify the Ingredients - Part 2
▷ Level 3 Quiz 3 - Identify the Cooking Skill

FIG. 10B

Your Score is 10% — 1106
 LinkedIn 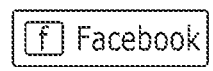 Facebook 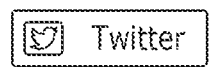 Twitter 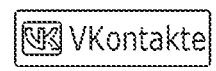 VKontakte
FIG. 11D
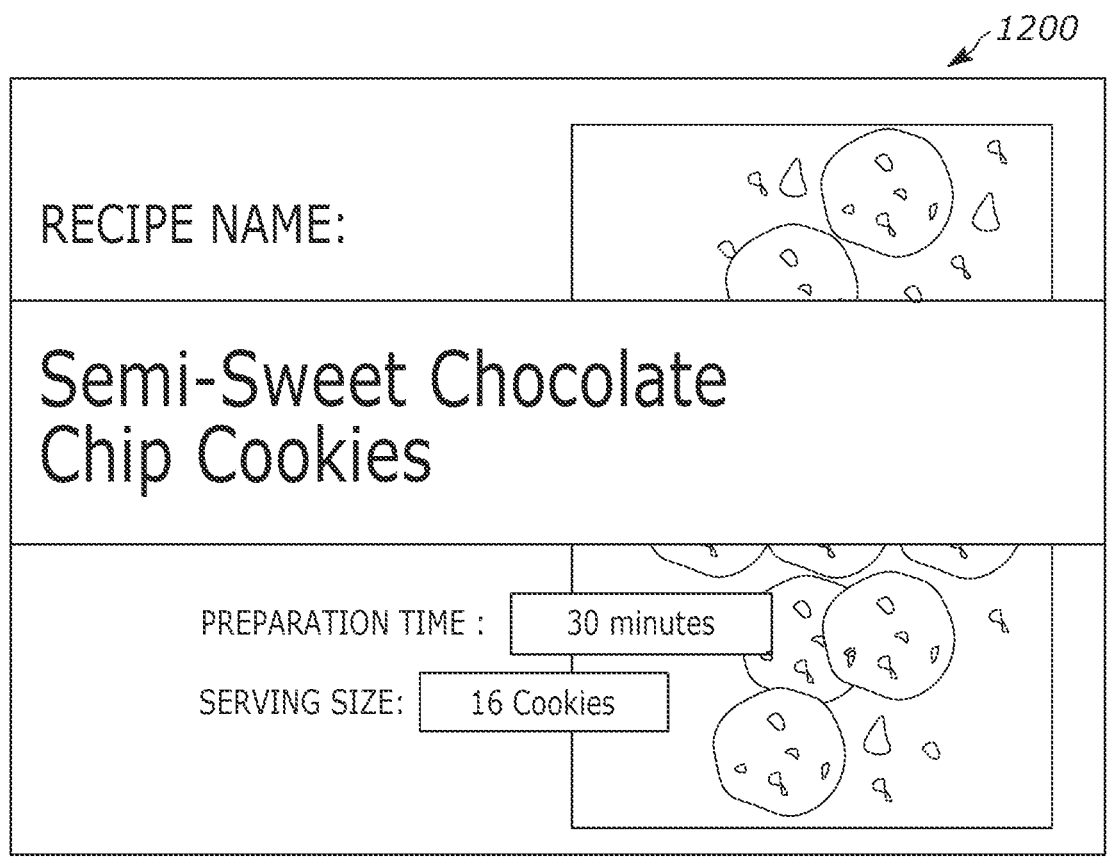
FIG. 12A

METHOD AND APPARATUS FOR CONVERTING RECIPE INSTRUCTIONS BASED ON A USER'S SKILL LEVEL

BACKGROUND OF THE DISCLOSURE

Field of the Disclosure

Embodiments of the present disclosure generally relate to instruction conversion systems and, more particularly, to a method for converting recipe instructions based on a user's skill level.

Description of the Related Art

The term "autism" describes a group of complex disorders affecting brain development. Adults and children with autism have difficulty, for example, interpreting the measurement instructions in recipes. As a result, autistic people typically need supervision in a kitchen or restaurant environment to assist them in reading the recipe instructions and ensure the measurements are correct and the final product is consistent. Visual indicators, such as color coded measuring cups and measuring spoons help a person with autism understand different measurement instructions.

Autism is tracked on a spectrum that identifies a severity level of the disorder, from very low functioning to very high functioning. A high functioning person with autism may be able to follow a recipe having more complex instructions than a lower functioning person with autism. For example, an instruction having complex quantities, such as one and a half cups of an ingredient, requires the user to measure the ingredient using a one cup measure as well as a half cup measure. Use of different measure types (one cup and half cup) for a same ingredient may be confusing to an autistic person depending on the person's level of autism.

Typically, cookbooks rank recipes based on instruction complexity. In other words, more difficult recipes are distinguished from more simple recipes. However, if a lower functioning autistic person desires to prepare a more complex recipe, there is a problem because the recipe instructions are not written for his or her level of understanding. A food establishment that hires people with autism requires consistency in the products produced by the food establishment. However, if recipes are not properly presented to the autistic employees, the quality of food being served may be affected.

Therefore, there is a need in the art for a method for converting recipe instructions based on a user's level of autism.

SUMMARY OF THE INVENTION

Embodiments of the present disclosure generally relate to a method for converting recipe instructions based on a user's level of autism as shown in and/or described in connection with at least one of the figures.

In some embodiments, a computer implemented method for presenting a recipe includes determining a skill level achieved by a user; providing the user access to a recipe corresponding to the skill level achieved by the user; receiving a selection of an accessible recipe; and displaying a selected recipe.

In some embodiments, a non-transitory computer readable medium storing computer readable instructions for causing a computer to implement a method for presenting a recipe, the method comprising: determining a skill level achieved by a user; providing the user access to a recipe corresponding to the skill level achieved by the user; receiving a selection of an accessible recipe; and displaying a selected recipe.

In some embodiments, a system for presenting a recipe includes a processor and a memory configured to determine a skill level achieved by a user; provide the user access to a recipe corresponding to the skill level achieved by the user; receive a selection of an accessible recipe; and display a selected recipe.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 depicts animation steps of a skill slideshow, according to one or more embodiments of the disclosure;

FIGS. 10A and 10B depict a listing of quizzes, according to one or more embodiments of the disclosure;

FIGS. 11A-11D depict a portion of a quiz, according to one or more embodiments of the disclosure;

FIGS. 12A-12C depict a portion of a recipe, according to one or more embodiments of the disclosure;

Figure 1:
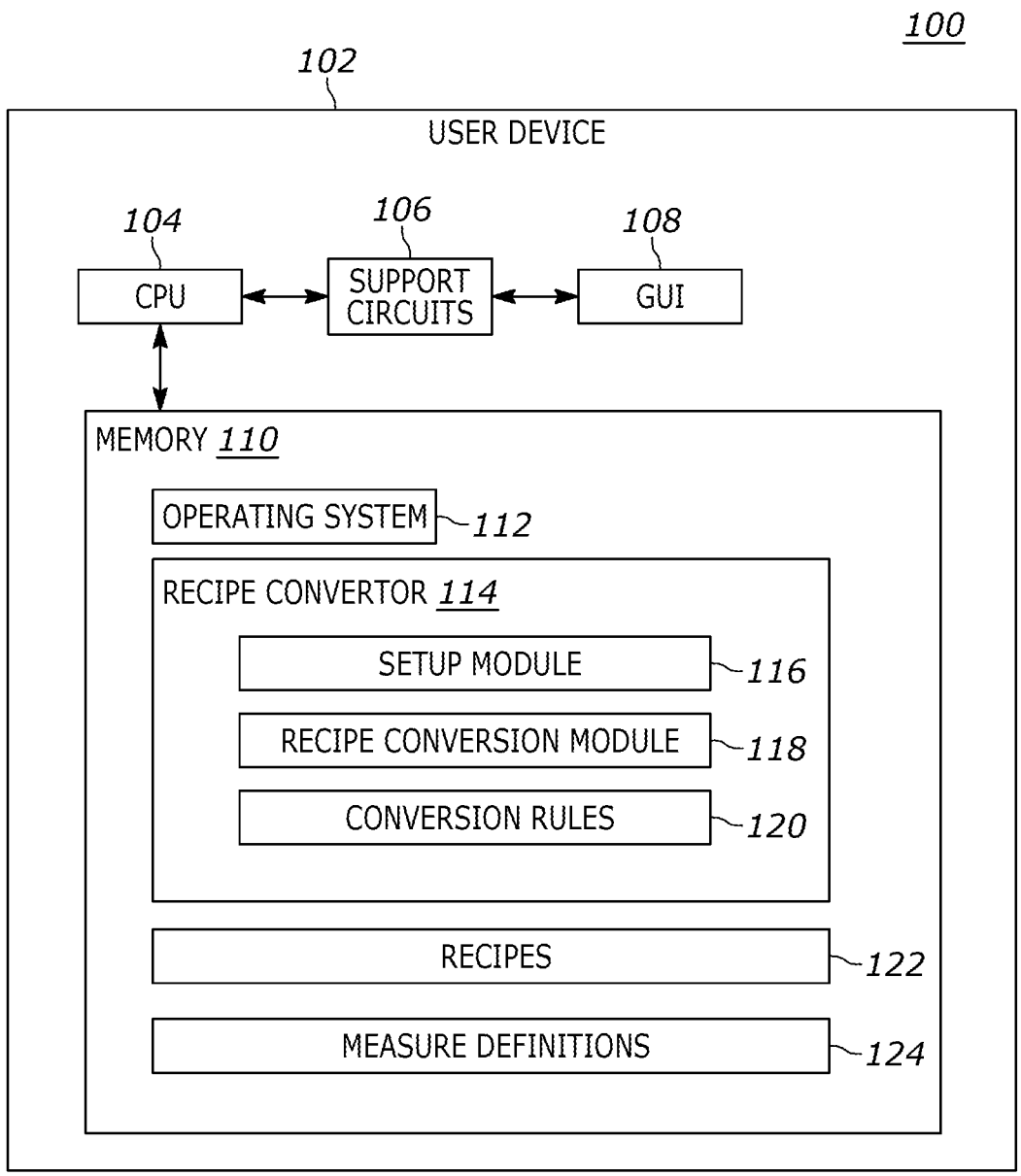
FIG. 1 depicts a computing system for converting recipe instructions based on a user's level of autism, according to one or more embodiments of the disclosure.

While the method for a method for converting recipe instructions based on a user's level of autism is described herein by way of example for several embodiments and illustrative drawings, those skilled in the art will recognize that the system and method for converting recipe instructions based on a user's level of autism is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method for converting recipe instructions based on a user's level of autism. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Some embodiments of the present disclosure provide a method for converting recipe instructions based on a user's level of autism. A plurality of measuring cups is defined, each of a distinct color. A plurality of measuring spoons is also defined, each of a distinct color. For example, a one-cup measure may be defined as a blue cup and a half-cup measure may be defined as a red cup. Upon receiving recipe instructions for conversion and a level of autism of a user, the measurements of the recipe instructions are converted based on the level of autism of the user. The recipe instructions are displayed using visual representations. For example, a measure of one and one half cups of flour may be converted to one blue cup and one red cup of flour for a high functioning autistic person. However, because multiple measures of the same ingredient using differently colored measuring cups may be confusing for a lower functioning autistic person, the measure of one and one half cups of flour may be converted to three red cups of flour. Similarly, recipe instructions using both tablespoon and teaspoon measurement units would be converted to multiple uses of the same colored measurement unit and displayed. As such, a same recipe may be converted differently depending on the level of autism of the user.

Various embodiments of a method for converting recipe instructions based on a user's level of autism are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts an apparatus 100 for converting measurements of a recipe based on a user's level of autism. The user device 102 is a type of computing device known to one of ordinary skill in the art. The user device 102 may include, but are not limited to desktop computers, laptops, tablet computers, Smartphones, and the like. The user device 102 comprises a Central Processing Unit (CPU) 104, support circuits 106, a graphical user interface (GUI) 108 and a memory 110. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The display 108 comprises one or more known display screens such as LCD, LED, AMOLED that display digital information graphically, for example, the rich Internet application. The memory 110 comprises at least one of Read Only Memory (ROM), Random Access Memory (RAM), disk drive storage, optical storage, removable storage and/or the like. The memory 110 includes an operating system (OS) 112, a recipe converter 114, a database of recipes 122 and measure definitions 124. The recipe converter 114 includes a setup module 116, a recipe conversion module 118, and conversion rules 120. The operating system 112 may include various commercially known operating systems. Conversion rules 120 identify one or more rules for each level of autism, including but not limited to a maximum number of different measure types per ingredient, and the like.

Measure types are defined via the GUI 108. An administrator defines which measuring cups are to be what color based on the set of measuring types, that is cups and spoons that are to be used to prepare the recipes. The setup module 116 displays a plurality of measure types, for example, 1 cup, ½ cup, ⅓ cup, ¼ cup, 1 tablespoon, 1 teaspoon, ½ teaspoon, ¼ teaspoon, ⅛ teaspoon. However, additional measure types may be listed including but not limited to 1½ cup, ⅛ cup, 2 tablespoons, ⅓ teaspoon, and the like. In some embodiments, a selection of colors is displayed. The administrator may select a color for each cup measure as well as a color for each spoon measure. The setup module 116 prevents the administrator from selecting a same color for two different cup measures. In some embodiments, the setup module 116 displays an error message if the same color is selected for two different cup measures. In some embodiments, the setup module 116 removes a color from the display when it is selected such that it cannot be selected for a different measure. Similarly, the setup module 116 prevents a same color from being selected for two different spoon measures. When color selection is complete, each measure and its corresponding color are stored in measure definitions 124.

The setup module 116 may also be used to input new recipes. New recipes include a list of ingredients as well as a measure for each, in addition to instructions for creating the recipe. In some embodiments, specific keywords are used in the instructions. Setup module 116 may also be used to convert the instruction keywords into visual representations, as well as the ingredients and their corresponding measures. For example, the keyword "stir" may be visually represented by a whisk for a lower functioning autistic person, whereas "stir" may be visually represented by an electric mixer for a higher functioning autistic person. The setup module 116 stores input recipes in the database of recipes 122.

A user may use the recipe converter 114 to convert a selected recipe 122. The recipe conversion module 118 displays a message requesting the level of autism of the user. The level may be input as a number, for example, from 1-10, or a selection of a radio button, and the like. In some embodiments, information regarding users may be stored in a user database (not shown). In such embodiments the level of autism is stored in the user database. As such, a user's name may be entered and their level of autism retrieved from the user database.

The recipe conversion module 118 displays a list of recipes that may be selected for conversion. In some embodiments, the list is searchable, for example by meal (e.g., breakfast, lunch, dinner), by ingredient (e.g., chocolate), or using any method of searching known in the art.

Upon selection of the recipe, the recipe conversion module 118 accesses conversion rules 120 in order to determine based on the identified level of autism, how to convert the measurements and/or the instructions, as described in further detail with respect to FIG. 2, below. The recipe conversion module 118 then displays the recipe on GUI 108 using visual representations based on the conversions rules 120 that apply to the user's level of autism. The displayed recipe may be saved, printed, or emailed.

Figure 2:
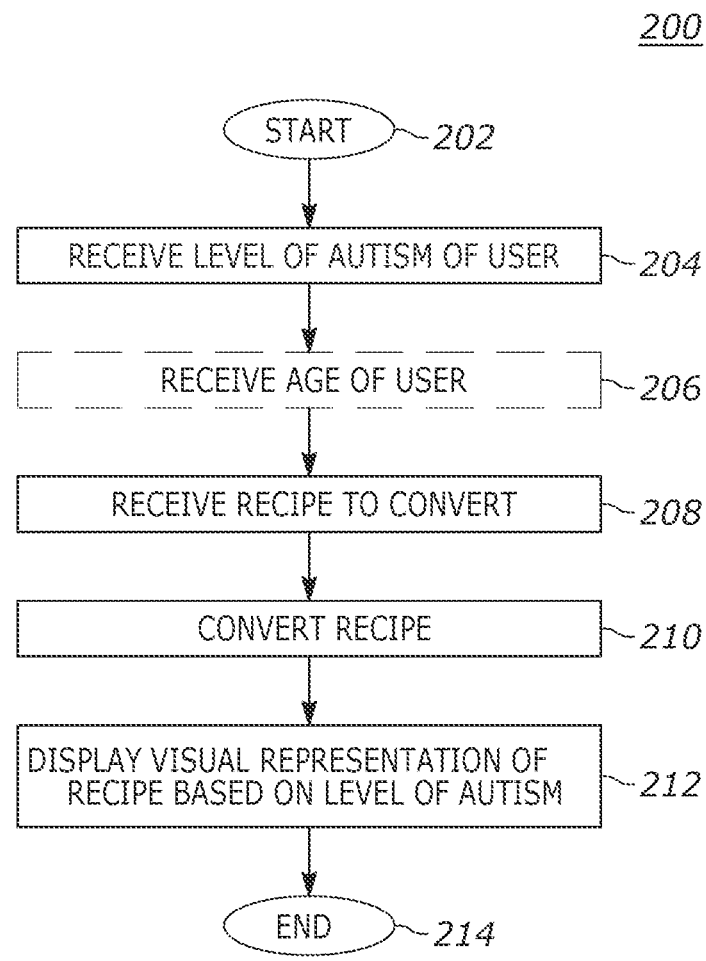
FIG. 2 depicts a flow diagram of a method for converting recipe instructions based on a user's level of autism, according to one or more embodiments of the disclosure.

FIG. 2 depicts a flow diagram of a method 200 for converting measurements of a recipe based on a user's level of autism, according to one or more embodiments. The method 200 starts at step 202 and proceeds to step 204.

At step 204, a level of autism is received by the recipe conversion module 118. The level of autism reflects the capabilities of a user who is preparing the recipe. In some embodiments, the level of autism is defined by a number. In some embodiments, the level of autism is defined by a category. In some embodiments, the levels of autism are defined based on specific abilities, for example, severe versus moderate reading impairment, or severe versus moderate writing impairment. In some embodiments, the level of autism of the user may be retrieved from a user profile.

Optionally, at step 206, an age of the user is received. The user's age may be used to convert instructions of a recipe. In some embodiments, the actual age of the user may be received via a graphical user interface. In some embodiments, a range of ages may be selected via a graphical user interface. In some embodiments, the age of the user may be retrieved from a user profile (not shown) stored in memory 110.

At step 208, a recipe is received. The recipe includes a list of ingredients as well as instructions for preparing the recipe. At step 201, the recipe is converted based on the level of autism and the age of the user, if input, as described in further detail with respect to FIGS. 3A-3C below. The recipe conversion module 118 accesses conversion rules 120 to determine what rules apply to the received level of autism of the user and the age of the user. The rules may include a maximum number of different measure types for an ingredient, what kitchen equipment may be used based on the level of autism and the like.

At step 212, the recipe is displayed using visual representations of the ingredients and their quantities as well as the instruction. The method 200 ends at step 214.

Figure 3A:
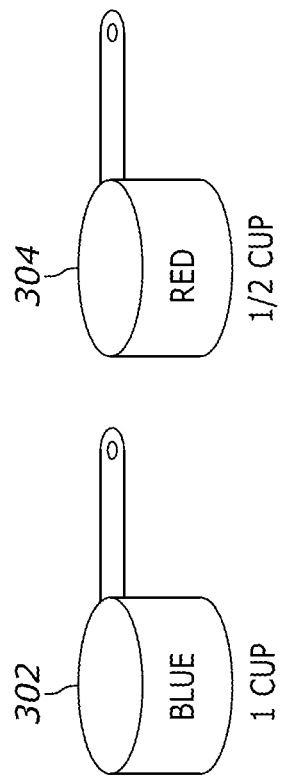
FIGS. 3A-3C are an exemplary illustration of using the method for converting recipe instructions based on a user's level of autism, according to one or more embodiments of the disclosure.
Figure 3B:
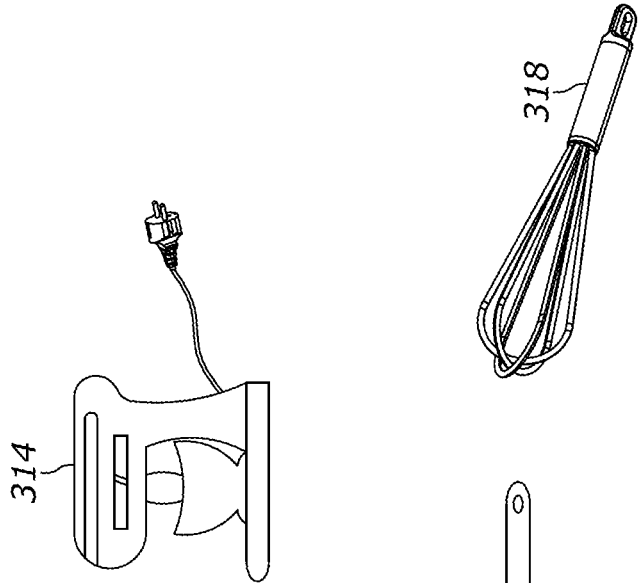
Figure 3C:
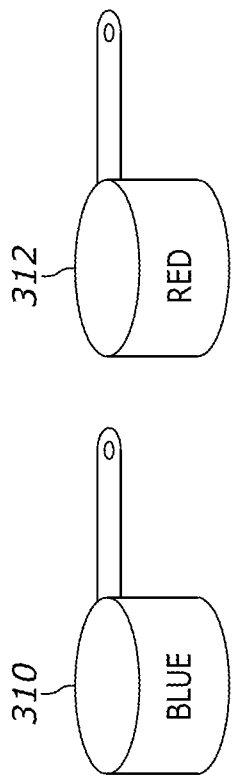

FIGS. 3A-3C illustrate the results of converting a measurement of an ingredient and an instruction based on a user's level of autism, according to one or more embodiments. FIG. 3A illustrates an example of a set of different types of cup measures 300 used to visually represent measurements in recipes. In the present example, a one-cup measure 302 is blue, a half-cup measure 304 is red, a one-third cup measure 306 is yellow, and a one-quarter cup measure 308 is green. An instruction in the present example reads, "Stir in 1½ cups of flour".

FIG. 3B illustrates how this instruction is converted for a high functioning autistic person. The conversion shows a one cup measure 310 that is blue, a half-cup measure 312 that is red, and an electric mixer 314. Due to the fact that the high functioning autistic person can easily understand use of multiple cup sizes for a single ingredient, multiple cup sizes are shown to measure the flour. In addition, because a high functioning autistic person can safely use an electric appliance, the electric mixer 314 is shown to illustrate the instruction for "stir".

FIG. 3C illustrates how this instruction is converted for a low functioning autistic person. The conversion shows three half-cup measures 316 and a whisk 318. Due to the fact that the low functioning autistic person may not understand using multiple size cups for a single ingredient, a single size cup is depicted three times to illustrate one and one-half cups. In addition, because the low functioning autistic person may not be able to safely use an electric appliance, the whisk 318 is shown to illustrate the instruction for "stir".

Example Computer System

Figure 4:
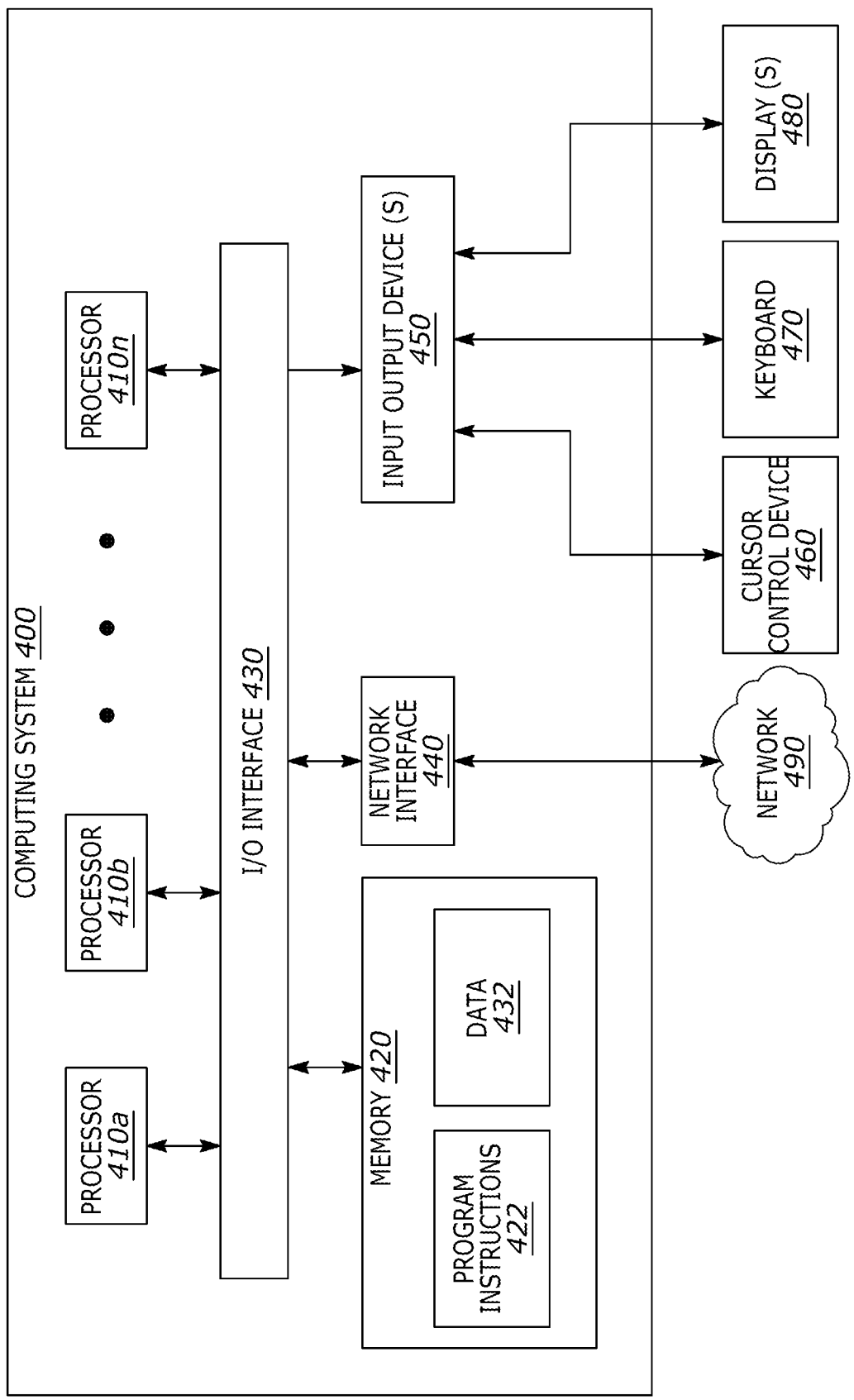
FIG. 4 depicts a computer system that can be utilized in various embodiments of the present disclosure.

FIG. 4 depicts a computer system that can be utilized in various embodiments of the present disclosure, according to one or more embodiments.

Various embodiments of an apparatus and method for converting measurements of a recipe based on a user's level of autism, as described herein, may be executed on one or more computer systems, which may interact with various other devices. One such computer system is computer system 400 illustrated by FIG. 4, which may in various embodiments implement any of the elements or functionality illustrated in FIGS. 1-3C. In various embodiments, computer system 400 may be configured to implement methods described above. The computer system 400 may be used to implement any other system, device, element, functionality or method of the above-described embodiments. In the illustrated embodiments, computer system 400 may be configured to implement method 200, as processor-executable executable program instructions 422 (e.g., program instructions executable by processor(s) 410a-n) in various embodiments.

In the illustrated embodiment, computer system 400 includes one or more processors 410*a-n* coupled to a system memory 420 via an input/output (I/O) interface 430. The computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410*a-n* may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410*a-n* may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowchart of FIG. 2. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Methods and systems in accordance with this description may include an educational application and website that may utilize color-coded measurements or other color-coded cooking equipment (e.g., bowls, utensils, knives, appliances, etc.), multiple levels of visual prompt cooking skills, multiple levels of interactive animated skills and quizzes which may be used as a basis to access and complete multi-leveled slideshow recipes. The levels may be indexed or otherwise associated with skill levels. Access to each recipe level may be determined by the completion, by a user, of a corresponding level's quizzes (or assessments) and cooking skills. Any number of levels of cooking skills, quizzes, and recipes may be used. Color-coding of measurements or cooking equipment may be useful to promote independent cooking skills for those individuals with autism who on entering into adulthood can use the color-coding to help them transition into a more independent and healthy lifestyle.

Figure 5:
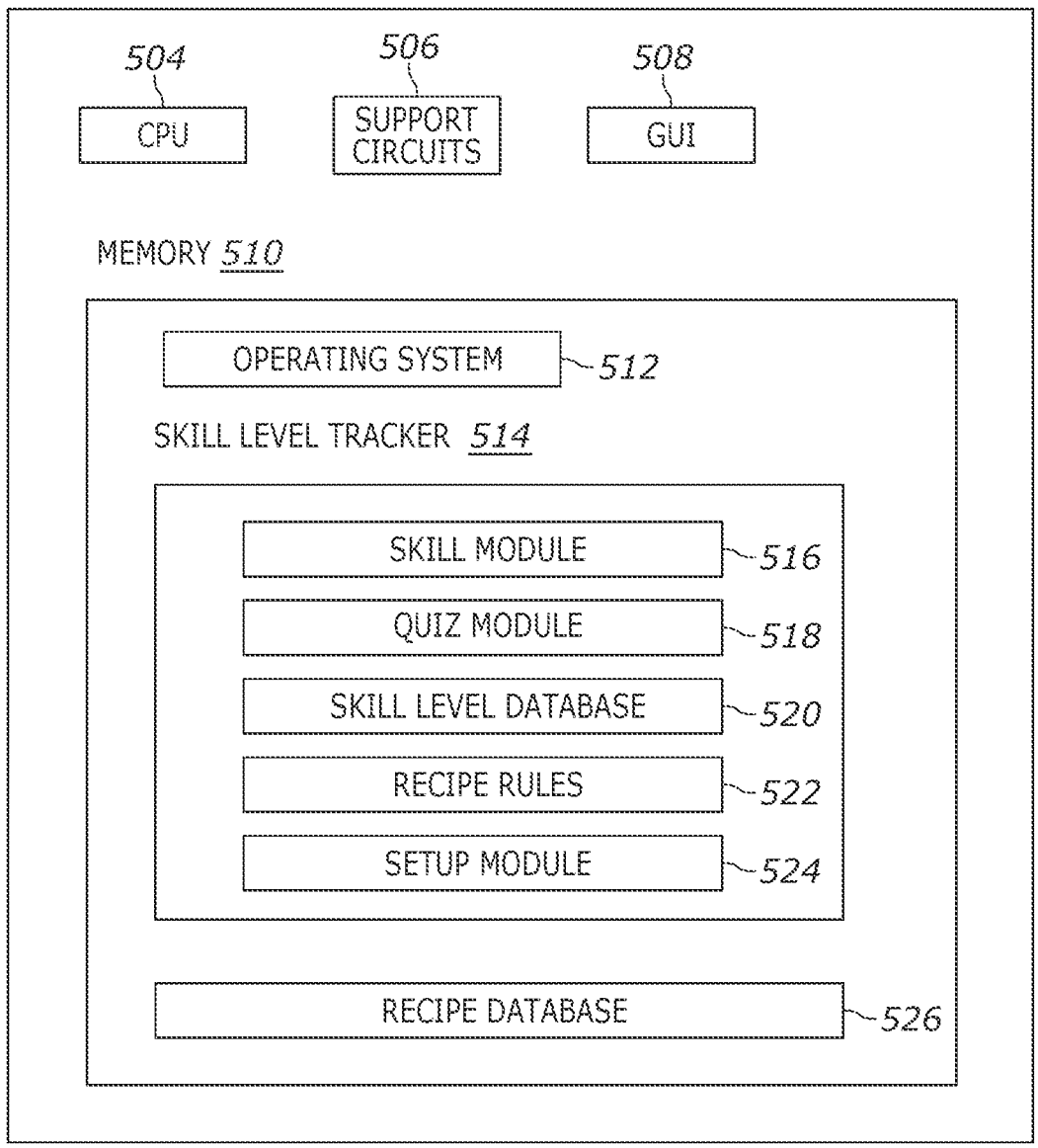
FIG. 5 a computing system for converting recipe instructions based on a user's skill level, according to one or more embodiments of the disclosure.

FIG. 5 depicts an apparatus 500 for displaying a recipe based on a skill level achieved by a user. The user device 502 is a type of computing device known to one of ordinary skill in the art. The user device 502 may include, but is not limited to desktop computers, laptops, tablet computers, Smart-phones, and the like. The user device 502 comprises a Central Processing Unit (CPU) 504, support circuits 506, a graphical user interface (GUI) 508 and a memory 510. The CPU 504 may comprise one or more commercially available microprocessors or microcontrollers that facilitate data processing and storage. The various support circuits 506 facilitate the operation of the CPU 504 and include one or more clock circuits, power supplies, cache, input/output circuits, and the like. The display 508 comprises one or more known display screens such as LCD, LED, AMOLED that display digital information graphically, for example, the rich Internet application. The memory 510 comprises at least one of Read Only Memory (ROM), Random Access Memory (RAM), disk drive storage, optical storage, removable storage and/or the like.

The memory 510 includes an operating system (OS) 512, a skill level tracker 514, and a recipe database 526. The skill level tracker 514 includes a skills module 516, a quiz module 518, skill levels database 520, and recipe rules 522. The operating system 512 may include various commercially known operating systems. Recipe rules 522 include rules for determining permissible recipe(s) to retrieve based on the skill level of a user.

The setup module 524 may be used to manage skills presentations used in the skills module 516, quizzes stored used in the quiz module 518, recipe rules 522, and recipes in the recipe database 526. Recipes stored in the recipe database 526 may include a slideshow presentation with slides including a list of ingredients, as well as a measure (a color-coded measure) for each ingredient, along with instructions for making a food item using the ingredients. The recipe slideshow may be interactive to allow the user to respond to prompts. In some embodiments, the recipe slideshow may permit a user to "check off" items as they are completed or to otherwise provide feedback, such as ask questions for alter follow up by an instructor or administrator. In some embodiments, specific keywords are used in the instructions. In some embodiments, the recipe slideshow may substitute visual representations for words, ingredients, and their corresponding measures depending on a skill level of a user. For example, the keyword "stir" may be visually represented by a whisk in a recipe for lower skill level, whereas "stir" may be visually represented by an electric mixer for a higher skill level. The setup module 116 may be configured to stores and/or retrieve recipes in the recipe database 526.

Figure 6:
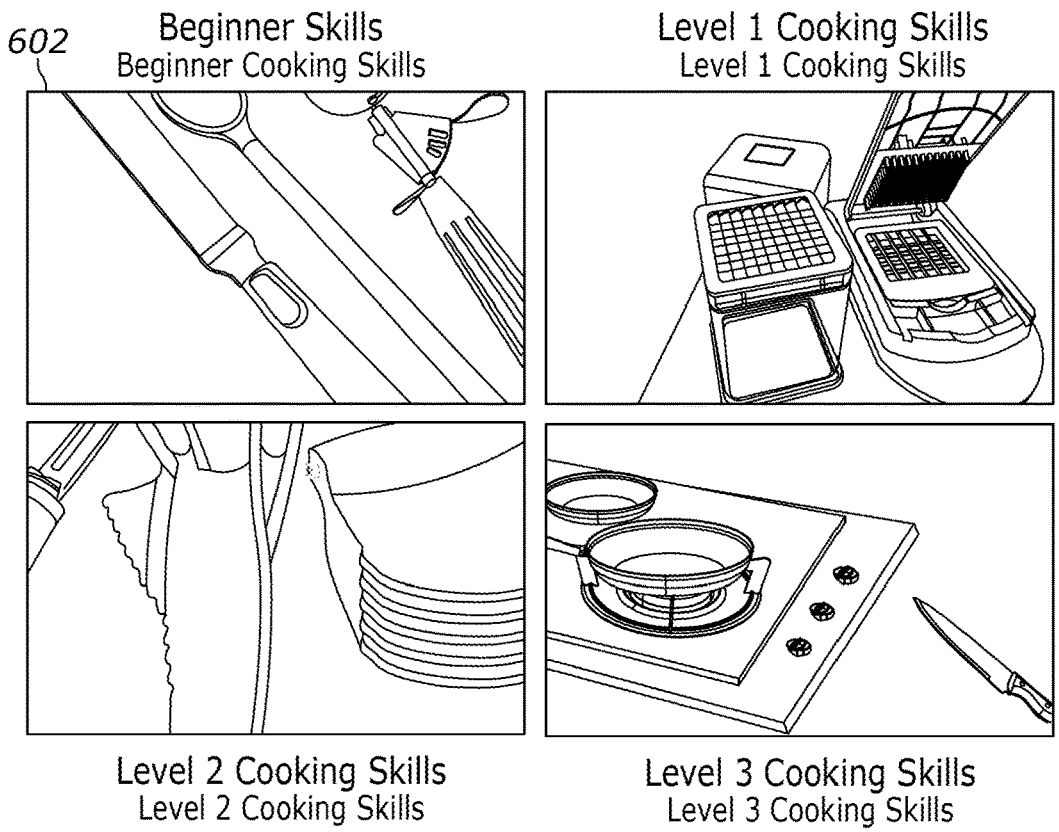
FIG. 6 depicts a display of skill levels, according to one or more embodiments of the disclosure.

The skill level tracker 514 may be used to present educational skill-building presentations to users and to assess and track user skill levels in order to determine whether to permit users to access recipes appropriate for the skill level of the user. In some embodiments, the skill level tracker 514 may display a list of skill levels 602 to a user, as shown for example in FIG. 6. The skill level of a user may be stored in a user profile in the skill levels database 520 so that skill levels that have been achieved by the user may be displayed differently from skill levels that have not been fully achieved. For example, skill levels that have been achieved may be displayed greyed out or displayed with an indicator (e.g., a check mark) to indicates that the skill level has been achieved by the user. In some embodiments, the skill level tracker 514 may not allow a user to select a skill level other than the skill level that the user previously achieved or is currently attempting to achieve so that the user gains skills sequentially in an predetermined progression. In some embodiments, the skill level tracker 514 may not limit a user selection of skill level so that a user may be free to work on skills at any level in any order.

Figure 7:
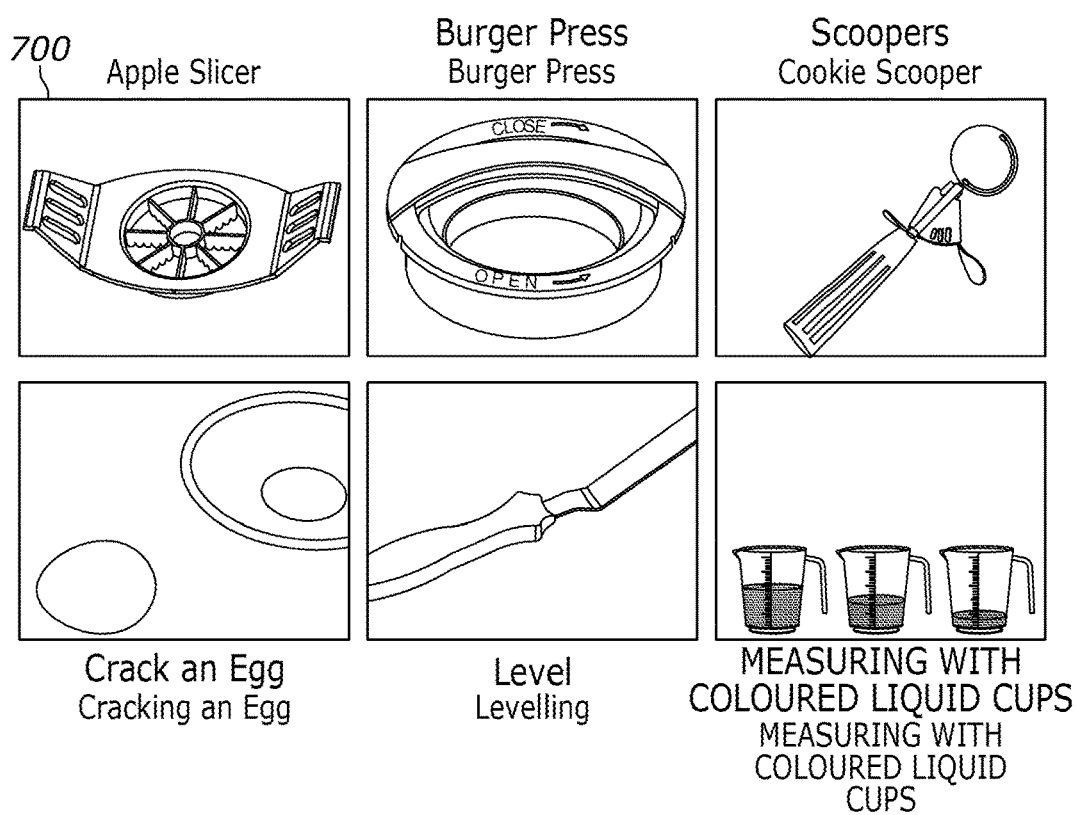
FIG. 7 depicts a display of skills, according to one or more embodiments of the disclosure.

The skill level tracker 514 may display a message requesting the user to select a skill level 602 and a skill for presentation. In some embodiments, and as shown in FIG. 7, upon selection of a skill level 600, the skills module 516 may display a list of skills 700 corresponding to the selected skill level 600. In some embodiments, and as shown in FIG. 7, the list of skills 700 may include at least one of images or text. In some embodiments, the skills module 516 may prompt a user to select a skill 700. Upon selection of the skill 700, the skill module 516 may retrieve a skill presentation corresponding to the selected skill level 600 and skill 700.

Figure 8:
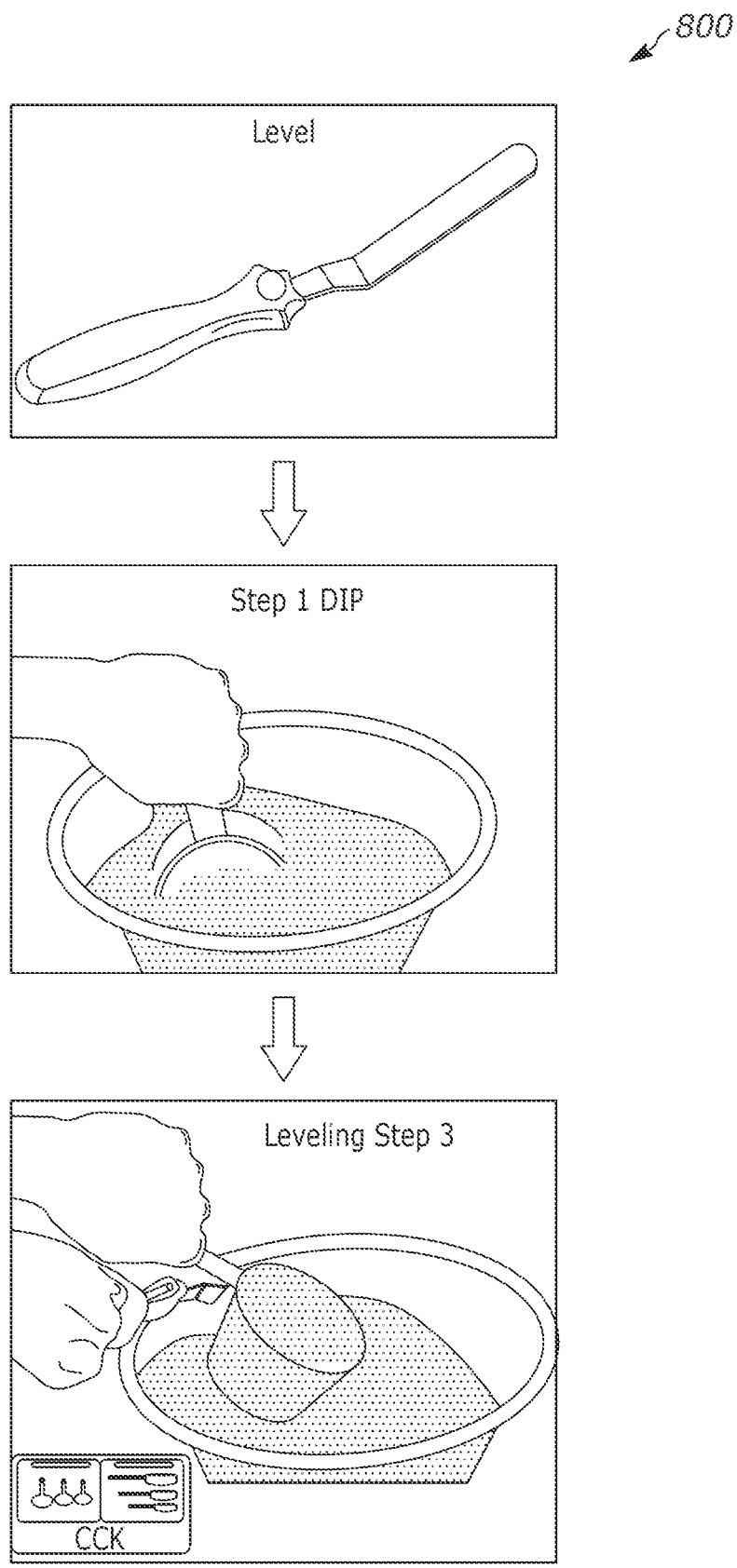
FIG. 8 depicts a portion of a skill slideshow, according to one or more embodiments of the disclosure.

In some embodiments, and as shown in FIG. 8, a skill presentation 800 may include at least one of audio, video, or graphical content, such picture and text. In some embodiments, the skill presentation 800 may include interactive elements or prompts, that may permit the user to interact with the presentation. For example, the skill presentation 800 may include prompts asking for feedback from the user to start, stop, continue, etc. In some embodiments, the skill presentation 800 may show color-coded measurements, such as in the shape of measurement utensils like measuring cups or spoons. The color coded-measurements may be presented as prompts for user interaction. For example, a user may be prompted to select a color-coded measure.

In some embodiments, the skill presentation 800 may include animations to show steps of a skill. For example, FIG. 9 shows animations 900 that may be displayed to show steps of pouring baking soda, steps of cracking an egg, steps of pouring flour, steps of pouring milk, steps of pouring sugar, and steps of mixing. The steps shown in FIG. 9 are not meant to be exclusive and more or fewer steps may be used.

Upon completion of a skill presentation 800, the user may be redirected to select another skill 700 or to take a quiz corresponding with the skill 700 just presented to assess whether the user has sufficiently learned the skill.

If a user selects to take a quiz, the quiz module 518 may present a list of quizzes 1000 as shown in FIGS. 10A and 10B. In some embodiments, and as shown in FIGS. 10A and 10B, one or more quizzes 1000 may cover multiple parts of a corresponding skill 700. In some embodiments, each quiz 1000 may be scored to receive credit for the quiz 1000.

Figure 11A:
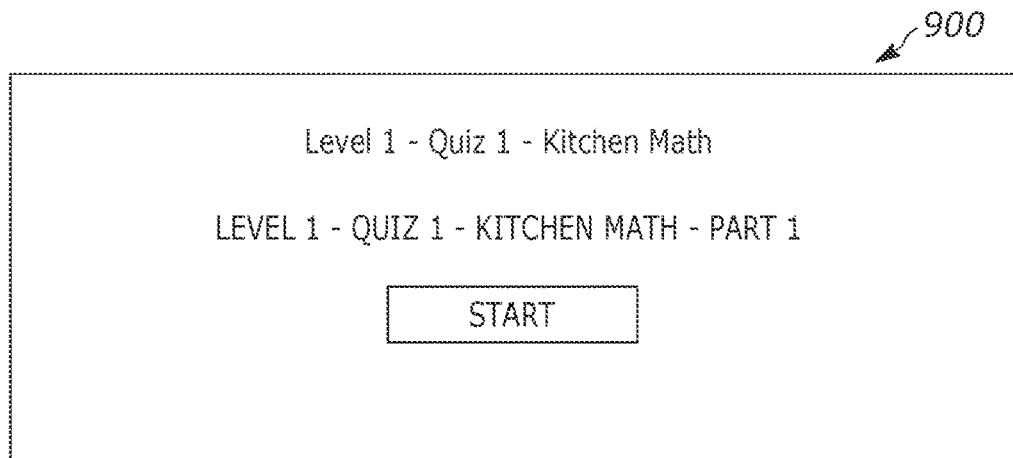
Figure 11B:
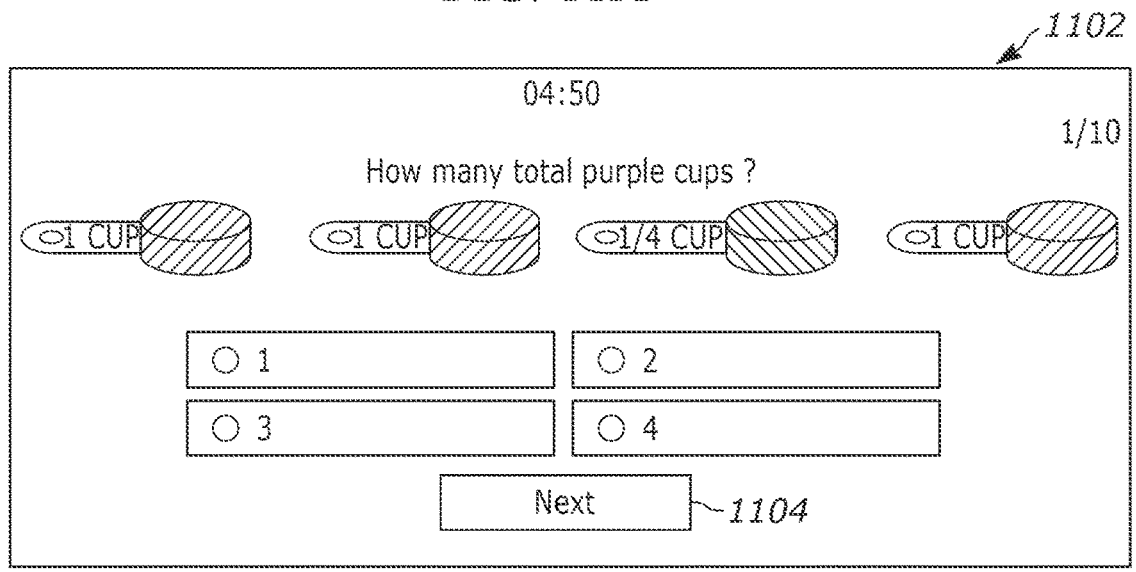
Figure 11C:
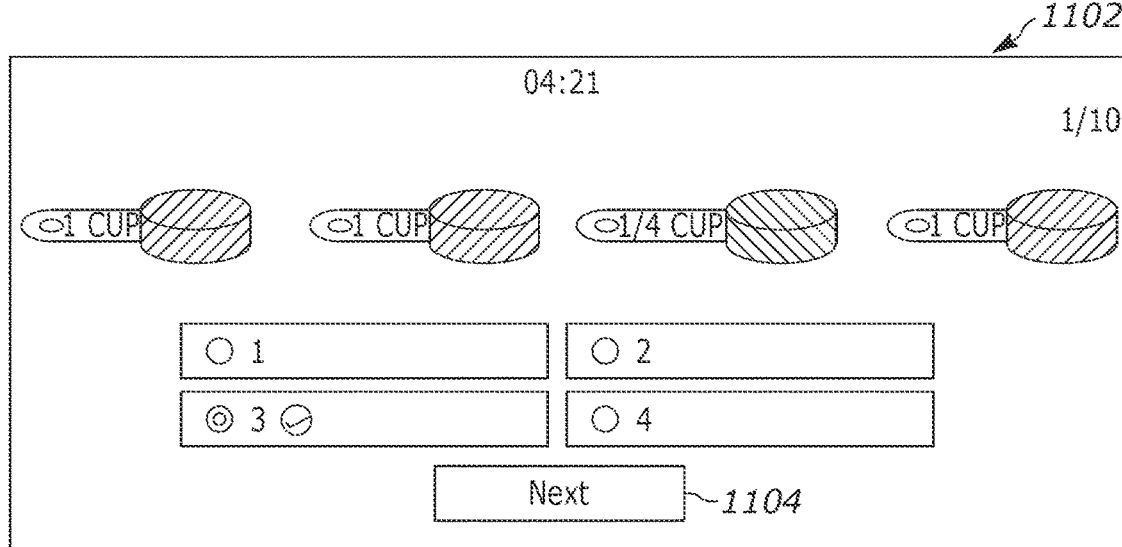

In some embodiments, and as shown in FIG. 11A, upon selection of a quiz 1000, the quiz module 518 may prompt the user to begin the quiz 1000. A user may select to start the quiz 1000, upon which the quiz module 518 may present a user with one or more question screens 1102 including one or more questions to be answered by the user, as shown in FIGS. 11B and 11C. The questions may be in a multiple-choice format as is shown in FIGS. 11B and 11C. In some embodiments, other question formats may be used, including fill-in-the-blank. Upon receiving an input for answering the question, a user may select a next button 1104 to record their answer and move to the next question as shown, for example, in FIG. 11C. In some embodiments, and as shown in FIG. 11D, at the conclusion of the quiz 1000, the quiz module 518 may present the user with a quiz score 1106 and may indicate whether the score is a passing score in order to get credit for the quiz.

The skill level tracker 514 may track the completed skills 700 and the successfully passed quizzes 1000 and may provide access to recipes based on the completed skills 700 and the successfully passed quizzes 1000. In some embodiments, the recipe rules 522 may be set so that at each skill level, all quizzes and skills associated with the skill level must be respectively passed and completed before access to recipes corresponding to the skill level is granted to the user. For example, before access is granted to recipes corresponding to the beginner level, a user must pass all quizzes and complete all skills corresponding to the beginner level. The skill level tracker 514 may continuously track the progress of a user on skills 700 and quizzes 1000 of a skill level 600 and may notify the user when the user has passed all quizzes 1000 and completed all skills 700 of the skill level 600 so that a user who has achieved the skill level 600 may access recipes corresponding to the achieved skill level.

Figure 12B:
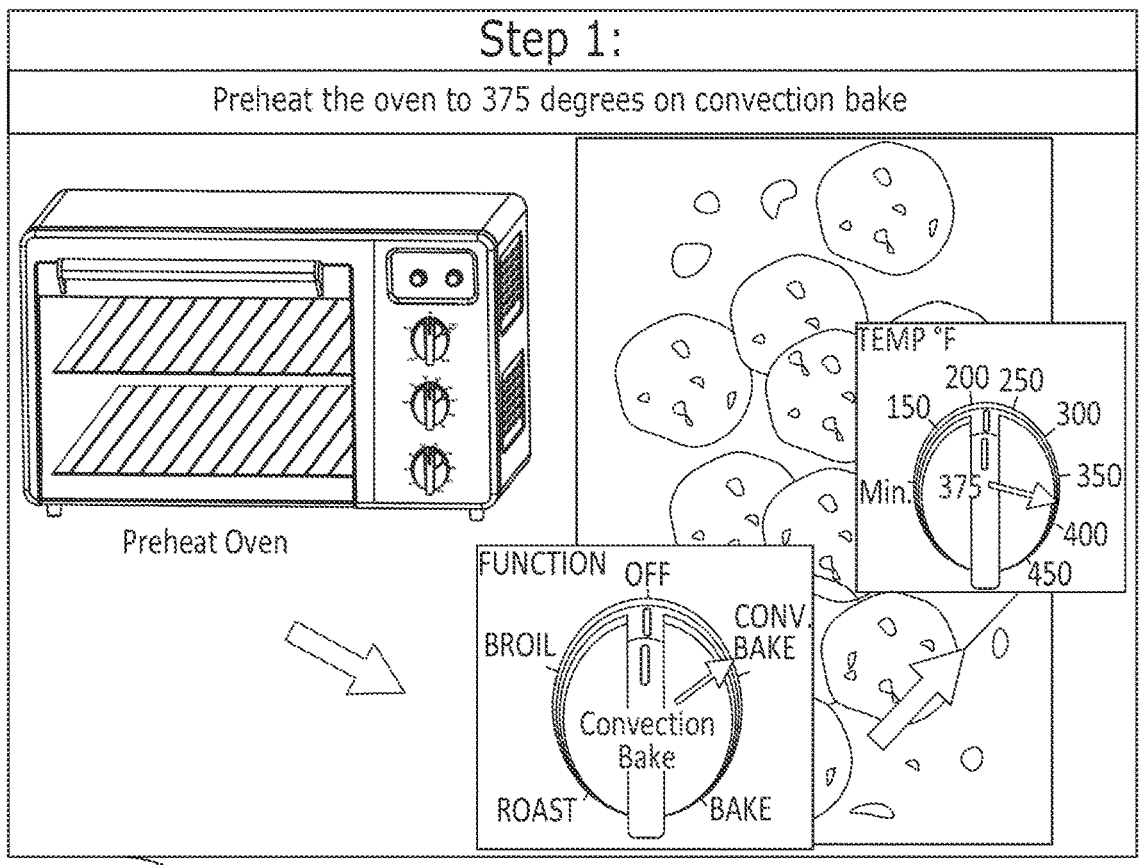
Figure 12C:
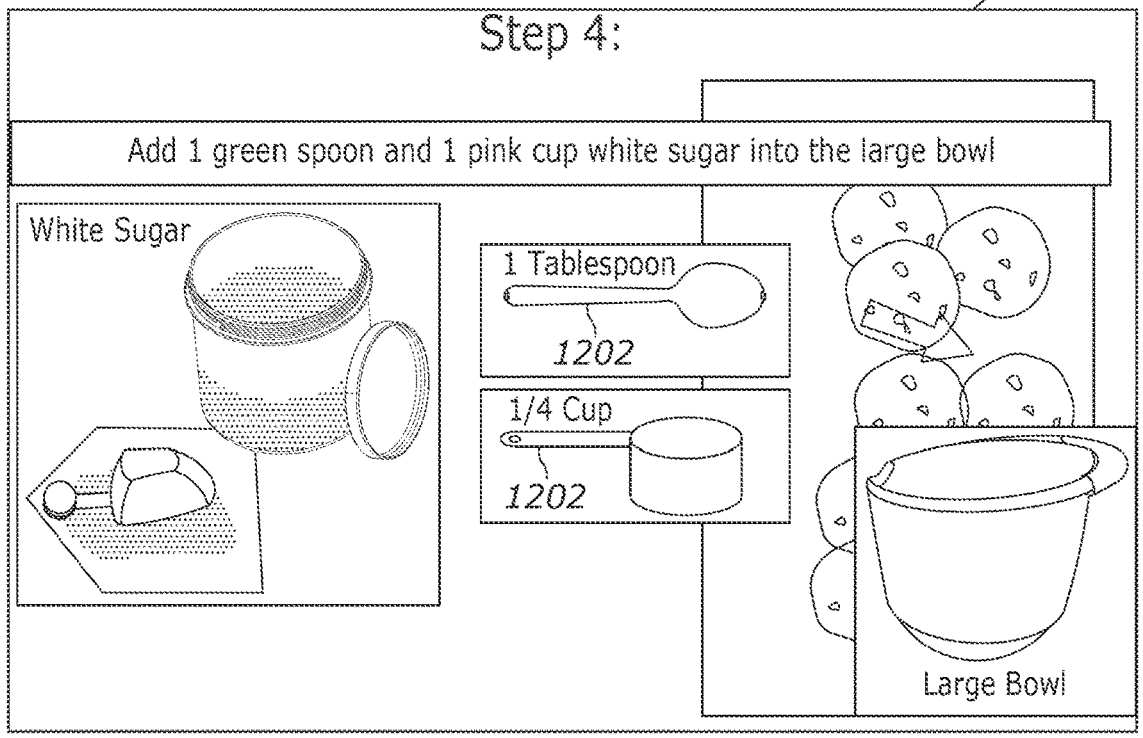

The recipe database 526 stores recipes corresponding with each skill level 600. Each recipe may include a slide show or a series of images with instructions for preparing a food item. In some embodiments, and as shown in FIGS. 12A-12C, a recipe 1200 is shown on the GUI 508 for making cookies based on the user's skill level 600. FIGS. 12B and 12C show at least two steps of the recipe 1200. In some embodiments, the displayed recipe 1200 may be saved, printed, or emailed.

In some embodiments, and as shown in FIG. 12C, color-coded measuring spoons 1202 are shown to indicate various amounts of ingredients to use in the recipe 1200. For example, in FIG. 12C, a ¼ cup measuring cup may be colored magenta and a teaspoon may be colored green. The slideshow may be interactive so that the user can receive feedback during food preparation using the recipe 1200. The slideshow may employ a video and/or audio capture device on a user computer or other communication terminal to provide interactivity. In some embodiments, the recipe 1200 may be displayed as a slideshow, which may include animations (e.g., animations 900) or video.

Figure 13:
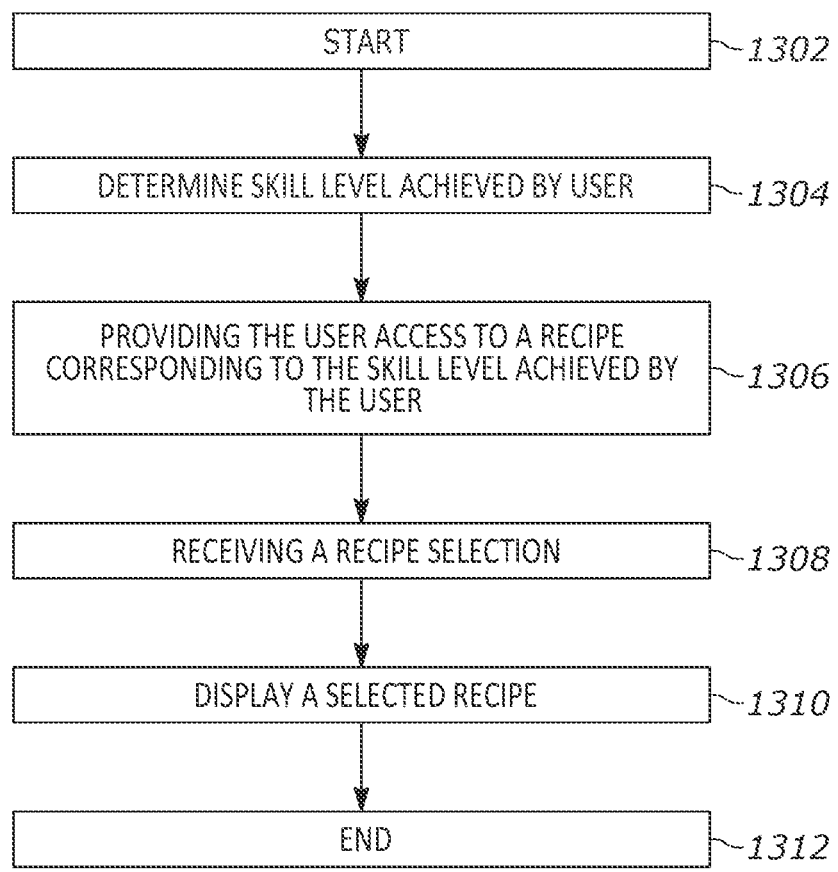
FIG. 13 depicts a flow diagram of a method for presenting recipe instructions based on a user's skill level, according to one or more embodiments of the disclosure.

FIG. 13 shows an embodiment of a method 1300 of providing a recipe 1200 to a user based on a completed skill level 600 of the user. In some embodiments, and as shown in FIG. 13, the method 1300 may begin at block 1302 with a user starting an educational application or a website in accordance with embodiments of the present disclosure. In some embodiments, the user may be authenticated to the education application or website, which may store a user profile, along with skill history and level and quiz history. In some embodiments, and as shown in FIG. 13, at block 1304 the method 1300 may include determining the skill level achieved by the user. In some embodiments, at block 1306 the method 1300 may include providing the user access to a recipe corresponding to the skill level achieved by the user. In some embodiments, upon a user achieving a skill level, one or more recipes corresponding to the achieved skill level that are stored in the recipe database 506 may be unlocked for access by the user. At block 1308, the method 1300 may include receiving a selection (e.g., from a user) of an accessible recipe. The user may be presented with a list of recipes from which to select. At block 1310, the method 1300 may include displaying a selected recipe. In some embodiments, predefined recipes 1200 corresponding to skill levels 600 may be stored in the recipe database 526 so that upon determination of the completed skill level of a user, a recipe 1200 corresponding to the achieved skill level may be retrieved and presented to the user. At block 1312 the method 1300 may end, for example, after the user finishes reviewing the recipe 1200.

In some embodiments, the achieved skill level determined may be used to also determine a level of autism of the user. For example, in some embodiments, a skill level stored in skill level database 520 may correlate with a level of autism. In some embodiments, upon a determination of a level of autism, the recipe displayed at block 1306 may be generated according to blocks 208-212 of method 200. In some embodiments, the method 200 may be modified so that recipe conversion at block 210 is based at least on the determined completed skill level. In some embodiments, a level of autism may be determined algorithmically, or by using machine learning models or artificial intelligence, based on the determined skill level.

Figure 14:
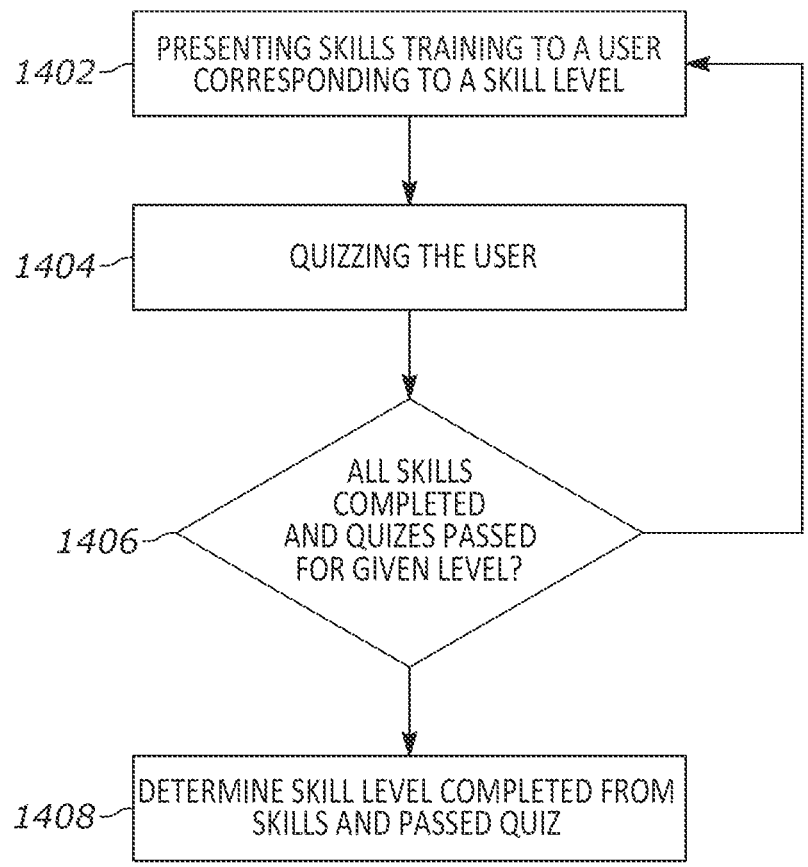
FIG. 14 depicts a flow diagram of a method for determining a skill level of a user, according to one or more embodiments of the disclosure.

FIG. 14 shows an example of a method 1400 of determining the skill level achieved by the user at block 1304, in accordance with embodiments of the present disclosure. At block 1402 the method 1400 may include presenting skills training to a user corresponding to a selected skill level selected by the user. At block 1404 the method 1400 may include quizzing a user, wherein the quiz corresponds to the selected skill level. At block 1406, the method 1400 may include determining whether the user has completed all skills training and passed all quizzes corresponding to the selected skill level. If the user has not completed all skills training and passed all quizzes corresponding to the selected skill level, the method 1400 may include repeating presenting and quizzing the user at blocks 1402 and 1404 until the user has completed all skills training and passed all quizzes corresponding to the selected skill level. If the user has completed all skills training and passed all quizzes corresponding to the selected skill level, the method 1400 may include determining that the selected skill level completed is the skill level achieved by the user as shown at block 1408.

While the foregoing is directed to embodiments of the present invention, other and further embodiments of the invention may be devised without departing from the basic scope thereof.

The invention claimed is:

1. A computer implemented method for presenting a cooking recipe, the method comprising:
receiving a request from a user for a cooking recipe;
determining, in response to the received request, a cooking skill level achieved by a user;
granting the user, in response to determining the achieved cooking skill level, electronic access to a cooking recipe corresponding to the cooking skill level achieved by the user;
after being granted electronic access, receiving a selection from the user of an accessible cooking recipe; and
electronically presenting a selected interactive cooking recipe to the user, wherein the cooking recipe is displayed showing cooking recipe steps using a color-coded measurement corresponding to physical color-coded measurement tools accessible to the user with the achieved cooking skill level, and wherein the interactive cooking recipe provides feedback to the user using at least one of audio or video capture device on a user computer during food preparation using the recipe, and
wherein determining the cooking skill level achieved includes:
electronically presenting a plurality of interactive cooking skill videos to the user, wherein each cooking skill video presents a cooking skill corresponding to a certain cooking skill level which the user has not yet achieved, wherein the cooking skills presented in the plurality of interactive cooking skill videos are cumulative, and wherein each cooking skill video includes interactive elements or prompts that permit the user to provide feedback during the presentation of the cooking skill video;
after viewing each cooking skill video, electronically displaying a quiz to the user to evaluate whether the user has mastered the cooking skill corresponding to the certain cooking skill level;
electronically receiving user responses to each quiz;
determining from the received responses for each quiz whether the user has passed or failed the quiz;
if it is determined that the user has not completed all cooking skill videos and passed all quizzes corresponding to the certain cooking skill level, repeating presenting and quizzing the user until the user has completed all cooking skill videos and passed all quizzes corresponding to the certain cooking skill level; and
if it is determined that the user has completed all cooking skill videos and passed all quizzes corresponding to the certain cooking skill level, determining that the user has achieved the certain cooking skill level.

2. The method of claim 1, wherein presenting cooking skills training includes presenting a slideshow.

3. The method of claim 2, wherein the slideshow includes at least one of an animation of step of the cooking skill or graphic of a color-coded measurement.

4. The method of claim 1, wherein presenting a cooking recipe includes presenting a slideshow.

5. The method of claim 4, wherein the slideshow includes at least one of an animation of a cooking recipe step or graphic of a color-coded measurement.

6. The method of claim 1, further comprising receiving selection of the cooking skill level by the user.

7. The method of claim 1, further comprising:
receiving a first cooking recipe comprising one or more ingredients and a measurement for each of the one or more ingredient;
determining a level of autism based on the skill level achieved by the user;
converting the measurements of the first cooking recipe to measurement instruction having a number of different measurement types is based on the level of autism; and
displaying the cooking recipe with visual representations of the measurements of the first cooking recipe.

8. A non-transitory computer readable medium storing computer readable instructions for causing a computer to implement a method for presenting a cooking recipe, the method comprising:
receiving a request from a user for a cooking recipe;
determining, in response to the received request, a cooking skill level achieved by a user;
granting the user, in response to determining the achieved cooking skill level, electronic access to a cooking recipe corresponding to the cooking skill level achieved by the user;
after being granted electronic access, receiving a selection from the user of an accessible cooking recipe; and
electronically presenting a selected interactive cooking recipe to the user, wherein the cooking recipe is displayed showing cooking recipe steps using a color-coded measurement corresponding to physical color-coded measurement tools accessible to the user with the achieved cooking skill level, and wherein the interactive cooking recipe provides feedback to the user using at least one of audio or video capture device on a user computer during food preparation using the recipe, and
wherein determining the cooking skill level achieved includes:
electronically presenting a plurality of interactive cooking skill videos to the user, wherein each cooking skill video presents a cooking skill corresponding to a certain cooking skill level which the user has not yet achieved, wherein the cooking skills presented in the plurality of interactive cooking skill videos are cumulative, and wherein each cooking skill video includes interactive elements or prompts that permit the user to provide feedback during the presentation of the cooking skill video;

after viewing each cooking skill video, electronically displaying a quiz to the user to evaluate whether the user has mastered the cooking skill corresponding to the certain cooking skill level;

electronically receiving user responses to each quiz;

determining from the received responses for each quiz whether the user has passed or failed the quiz;

if it is determined that the user has not completed all cooking skill videos and passed all quizzes corresponding to the certain cooking skill level, repeating presenting and quizzing the user until the user has completed all cooking skill videos and passed all quizzes corresponding to the certain cooking skill level; and if it is determined that the user has completed all cooking skill videos and passed all quizzes corresponding to the certain cooking skill level, determining that the user has achieved the certain cooking skill level.

9. The non-transitory computer readable medium of claim 8, wherein presenting cooking skills training includes presenting a slideshow.

10. The non-transitory computer readable medium of claim 9, wherein the slideshow includes at least one of an animation of step of the cooking skill or graphic of a color-coded measurement.

11. The non-transitory computer readable medium of claim 8, wherein presenting a cooking recipe includes presenting a slideshow.

12. The non-transitory computer readable medium of claim 11, wherein the slideshow includes at least one of an animation of a cooking recipe step or graphic of a color-coded measurement.

13. The non-transitory computer readable medium of claim 8, further comprising receiving selection of the cooking skill level by the user.

14. The non-transitory computer readable medium of claim 8, further comprising:

receiving a first cooking recipe comprising one or more ingredients and a measurement for each of the one or more ingredient;

determining a level of autism based on the cooking skill level achieved by the user;

converting the measurements of the first cooking recipe to measurement instruction having a number of different measurement types is based on the level of autism; and displaying the cooking recipe with visual representations of the measurements of the first cooking recipe.

15. A system for presenting a cooking recipe, the system comprising:

a processor and a memory configured to:

receive a request from a user for a cooking recipe;

determine, in response to the received request, a cooking skill level achieved by a user;

grant the user, in response to determining the achieved cooking skill level, electronic access to a cooking recipe corresponding to the cooking skill level achieved by the user;

after being granted electronic access, receive a selection from the user of an accessible cooking recipe; and electronically present a selected interactive cooking recipe to the user, wherein the cooking recipe is displayed showing cooking recipe steps using a color-coded measurement corresponding to physical color-coded measurement tools accessible to the user with the achieved cooking skill level, and wherein the interactive cooking recipe provides feedback to the user using at least one of audio or video capture device on a user computer during food preparation using the recipe, and wherein determining the cooking skill level achieved includes:

electronically presenting a plurality of interactive cooking skill videos to the user, wherein each cooking skill video presents a cooking skill corresponding to a certain cooking skill level which the user has not yet achieved, wherein the cooking skills presented in the plurality of interactive cooking skill videos are cumulative, and wherein each cooking skill video includes interactive elements or prompts that permit the user to provide feedback during the presentation of the cooking skill video;

after viewing each cooking skill video, electronically displaying a quiz to the user to evaluate whether the user has mastered the cooking skill corresponding to the certain cooking skill level;

electronically receiving user responses to each quiz;

determining from the received responses for each quiz whether the user has passed or failed the quiz;

if it is determined that the user has not completed all cooking skill videos and passed all quizzes corresponding to the certain cooking skill level, repeating presenting and quizzing the user until the user has completed all cooking skill videos and passed all quizzes corresponding to the certain cooking skill level; and if it is determined that the user has completed all cooking skill videos and passed all quizzes corresponding to the certain cooking skill level, determining that the user has achieved the certain cooking skill level.

16. The system of claim 15, wherein the processor and the memory are configured to:

receive a first cooking recipe comprising one or more ingredients and a measurement for each of the one or more ingredient;

determine a level of autism based on the cooking skill level achieved by the user;

convert the measurements of the first cooking recipe to measurement instruction having a number of different measurement types is based on the level of autism; and display the cooking recipe with visual representations of the measurements of the first cooking recipe.

17. The system of claim 15, wherein the processor and memory are configured to present at least one of the cooking skills training or the cooking recipe as a slideshow including at least one of an animation or a graphic of a color-coded measurement.

* * * * *